United States Patent [19]

van Ooij et al.

[11] Patent Number: 5,759,629
[45] Date of Patent: Jun. 2, 1998

[54] METHOD OF PREVENTING CORROSION OF METAL SHEET USING VINYL SILANES

[75] Inventors: Wim J. van Ooij, Fairfield, Ohio; Wei Yuan, Wheeling, Ill.

[73] Assignee: University of Cincinnati, Cincinnati, Ohio

[21] Appl. No.: 743,864

[22] Filed: Nov. 5, 1996

[51] Int. Cl.$^6$ ................ B05D 1/36; B05D 3/02; B05D 7/14
[52] U.S. Cl. ............... 427/384; 427/409; 106/14.15; 106/14.42
[58] Field of Search ............... 427/384, 409; 106/14.15, 14.42

[56] References Cited

U.S. PATENT DOCUMENTS

| 4,401,500 | 8/1983 | Hamada et al. | 156/307.5 |
|---|---|---|---|
| 4,681,636 | 7/1987 | Saito et al. | 106/287.15 |
| 4,863,794 | 9/1989 | Fujii et al. | 428/325 |
| 5,108,793 | 4/1992 | van Ooij et al. | 427/327 |
| 5,200,275 | 4/1993 | van Ooij et al. | 428/623 |
| 5,221,371 | 6/1993 | Miller | 148/273 |
| 5,292,549 | 3/1994 | van Ooij et al. | 427/156 |
| 5,322,713 | 6/1994 | van Ooij et al. | 427/327 |
| 5,326,594 | 7/1994 | Sabata et al. | 427/327 |
| 5,389,405 | 2/1995 | Purnell et al. | 427/387 |
| 5,412,011 | 5/1995 | Morris et al. | 524/261 |
| 5,433,976 | 7/1995 | van Ooij et al. | 427/387 |
| 5,455,080 | 10/1995 | van Ooij | 427/470 |
| 5,478,655 | 12/1995 | Sabata et al. | 428/469 |
| 5,498,481 | 3/1996 | van Ooij | 428/413 |
| 5,539,031 | 7/1996 | van Ooij | 524/188 |

FOREIGN PATENT DOCUMENTS

| 2110461 | 7/1994 | Canada. |
|---|---|---|
| 492306 | 1/1992 | European Pat. Off.. |
| 533606 | 3/1993 | European Pat. Off.. |
| 579253 | 1/1994 | European Pat. Off.. |
| 53-3076 B | 4/1976 | Japan. |
| 63-34793 B | 2/1983 | Japan. |
| 58-52036 B | 11/1983 | Japan. |
| 60-208480 | 10/1985 | Japan. |
| 62-7538 A | 1/1987 | Japan. |
| 53-3275 B | 2/1987 | Japan. |
| 62-57470 A | 3/1987 | Japan. |
| 62-216727 | 9/1987 | Japan. |
| 63-97266 A | 4/1988 | Japan. |
| 63-97267 A | 4/1988 | Japan. |
| 4046932 | 2/1992 | Japan. |
| 4106174 | 4/1992 | Japan. |
| 61-84792 A | 7/1994 | Japan. |
| 6279732 | 10/1994 | Japan. |

OTHER PUBLICATIONS

Wu et al, Huahsueh Hsueh PAO (1980), 38(5), 484–8.
Kurth et al, J. Phys. Chem. (1992), 96(16), 6707–12.
Comyn et al, Int. J. Adhesion (1990), 10(1), 13–18.
Hornstrom, S–E et al., Paint Adhesion and corrosion performance of chromium–free pretreatments of 55% Al–Zn–coated steel, (1996), *J. Adhesion Sci. Technol.*, v. 10, pp. 883–904.
van Ooij W.J., Novel Silane–Based Pretreatments of Metals to Replace Chromium and Phosphate Treatment, Proceedings from: *2nd Annual Advanced Techniques for Replacing Chromium: An Information Exchange*, pp. 287–310, published Dec. 1995.
Sabata, A. et al., The interphase in painted metals pretreated by functional silanes, (1993), *J. Adhesion Sci. Technol.*, v. 7, pp. 1153–1170.
van Ooij, W.J. et al., On the, characterization and performance of silane coupling between organic coatings and metallic or ceramic substrates, (1996), *American Institute of Physics*, pp. 305–321.
van Ooij, W.J., et al., Characterization of Films of Organofuctional Silanes by ToF–SIMS, (1993), *Surface and Interface Analysis* v. 20, pp. 475–484.
Sabata, A. et al., Trends toward a better understanding of the interface in painted metals; Silane–based pretreatments of sheet steels for improved paintability and corrosion performance, (1993), *Trends in Corrosion Research*, v. 1, pp. 181–193.
van Ooij, W.J. et al., Modification of the interface between paints and stainless steels by means of an interphase of crosslinked Organofunctional silanes, (1993), *Mat. Res. Soc. Symp. Proc*, v. 304, pp. 155–160.
Sabata, A. et al., TOFSIMS Studies of Cleaning Procedures and Silane Surface Treatments of Steels, (1995), *J. of Testing and Evaluation* v. 23, No. 2, pp. 119–125.

*Primary Examiner*—Erma Cameron
*Attorney, Agent, or Firm*—Dinsmore & Shohl LLP

[57] ABSTRACT

A method of preventing corrosion of a metal sheet, comprising the steps of: providing a metal sheet chosen from the group consisting of coated steel sheet, aluminum sheet and aluminum alloy sheet; and applying a solution containing at least one hydrolyzed vinyl silane to the metal sheet. A coating of paint or other polymer may be applied directly on top of the vinyl silane coating.

23 Claims, No Drawings

METHOD OF PREVENTING CORROSION OF METAL SHEET USING VINYL SILANES

BACKGROUND OF THE INVENTION

1. Field of the Invention

The present invention relates to a method of preventing corrosion of metal sheet. More particularly, the method comprises applying a solution containing one or more hydrolyzed vinyl silanes to the metal sheet. The method is particularly useful as a pretreatment step prior to painting of galvanized steel.

2. Description of Related Art

Most metal sheets are susceptible to corrosion, including the formation of various types of rust. Such corrosion will significantly affect the quality of such metal sheets, as well as that of the products produced therefrom. Although rust and the like may often be removed from the metal sheets, such steps are costly and may further diminish the strength of the metal. In addition, when polymer coatings such as paints, adhesives or rubbers are applied to the metals, corrosion of the base metal material may cause a loss of adhesion between the polymer coating and the base metal.

By way of example, metallic coated steel sheet such as galvanized steel is used in many industries, including the automotive, construction and appliance industries. In most cases, the galvanized steel is painted or otherwise coated with a polymer layer to achieve a durable and aesthetically-pleasing product. Galvanized steel, particularly hot-dipped galvanized steel, however, often develops "white rust" during storage and shipment.

White rust (also called "storage strain") is typically caused by moisture condensation on the surface of the galvanized steel which reacts with the zinc coating. This white rust is aesthetically unappealing and impairs the ability of the galvanized steel to be painted or otherwise coated with a polymer. Thus, prior to such coating, the zinc surface of the galvanized steel must be pretreated in order to remove the white rust which is present, and prevent it from reforming beneath the polymer layer. Various methods are currently employed to not only prevent the formation of white rust during shipment and storage, but also to prevent the formation of the white rust beneath a polymer coating (e.g., paint).

In order to prevent white rust on hot-dipped galvanized steel during storage and shipping, the surface of the steel is often passivated by forming a thin chromate film at the surface of the steel. While such chromate coatings do provide resistance to the formation of white rust, chromium is highly toxic and environmentally undesirable.

It is also known to employ a phosphate conversion coating in conjunction with a chromate rinse in order to improve paint adherence and provide corrosion protection. It is believed that the chromate rinse covers the pores in the phosphate coating, thereby improving the corrosion resistance and adhesion performance. Once again, however, it is highly desirable to eliminate the use of chromate altogether. Unfortunately, however, the phosphate conversion coating is generally not effective without the chromate rinse.

Recently, various techniques for eliminating the use of chromate have been proposed. These include coating the galvanized steel with an inorganic silicate and followed by treating the silicate coating with an organofunctional silane (U.S. Pat. No. 5,108,793). U.S. Pat. No. 5,292,549 teaches the rinsing of metallic coated steel sheet with a solution containing an organic silane and a crosslinking agent. Various other techniques for preventing the formation of white rust on galvanized steel, as well as preventing corrosion on other types of metal sheets, have also been proposed. Many of these proposed techniques, however, are ineffective, or require time-consuming, energy-inefficient, multi-step processes. Thus, there is a need for a simple, low-cost technique for preventing corrosion on the surface of galvanized steel or other metal sheets, particularly wherein a polymer coating such as paint is to be applied to the metal.

SUMMARY OF THE INVENTION

It is an object of the present invention to provide a method of preventing corrosion of metal sheet.

It is another object of the present invention to provide a method of preventing corrosion of coated steel sheet which employs a single-step treatment process.

It is yet another object of the present invention to provide a treatment solution for preventing corrosion of galvanized steel sheet, wherein the treatment composition need not be removed prior to painting.

The foregoing objects can be accomplished, in accordance with one aspect of the present invention, by providing a method of preventing corrosion of a metal sheet, comprising the steps of:

(a) providing a metal sheet, said metal chosen from the group consisting of:
  steel sheet coated with a metal chosen from the group consisting of: zinc, zinc alloy, aluminum and aluminum alloy;
  aluminum sheet; and
  aluminum alloy sheet;

and (b) applying a solution containing one or more hydrolyzed vinyl silanes to said metal sheet, each of said hydrolyzed vinyl silanes having

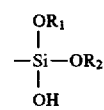

at one terminus and a vinyl group at the opposite terminus, wherein $R_1$ and $R_2$ are each chosen from the group consisting of hydrogen, alkyl, and acetyl.

The total concentration of unhydrolyzed vinyl silanes used to prepare the treatment solution is greater than about 4% by volume, based upon the total volume of solution components.

The unhydrolyzed vinyl silanes used to prepare the treatment solution are preferably selected from the group consisting of:

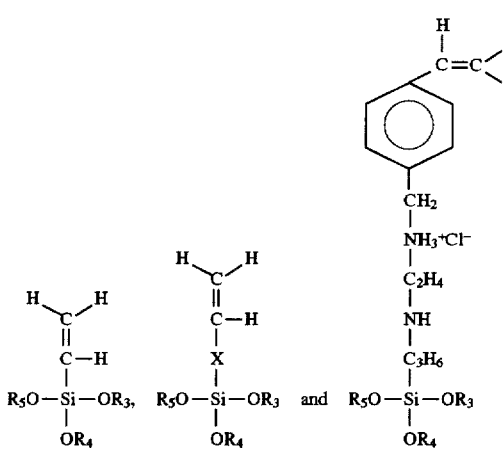

wherein X is an alkyl group, and $R_3$, $R_4$, and $R_5$ are each chosen from the group consisting of: $C_1$-$C_4$ alkyl, and acetyl. More preferably, X is a $C_1$-$C_{10}$ alkyl.

The other treatment solution components preferably include water, and optionally at least one alcohol which may be chosen from the group consisting of: methanol, ethanol, propanol, butanol, and isomers thereof. The pH of the vinyl silane solution should be between about 3 and about 8, more preferably between about 4 and about 6. The vinyl silane solution may be applied to the sheet by dipping the sheet in the solution for between about 10 seconds and about one hour, and the sheet may be heat treated after application of the treatment composition.

The metal sheet is preferably hot dip coated with a metal chosen from the group consisting of zinc, zinc alloy, aluminum and aluminum alloy, and is more preferably hot-dipped galvanized steel. The unhydrolyzed vinyl silane(s) used to prepare the treatment solution may be selected from the group consisting of: vinyltrimethoxysilane, vinyltriethoxysilane, vinyltripropoxysilane, vinyltriisopropoxysilane, vinyltributoxysilane, vinylacetoxysilane, vinyl methyltrimethoxysilane, vinylethylltrimethoxysilane, vinylpropyltrimethoxysilane, and N-[2-(vinylbenzylamino)-ethyl]-3-aminopropyltrimethoxysilane. The treated sheet may be coated with a polymer directly on top of the vinyl silane coating, and this polymer may be a paint, and adhesive or a rubber. Suitable paints include polyesters, polyurethanes and epoxies.

DETAILED DESCRIPTION OF THE PREFERRED EMBODIMENTS

Applicants have found that the corrosion of metal sheet, particularly galvanized steel, can be prevented by applying a treatment solution containing one or more hydrolyzed vinyl silanes to the metal sheet. The corrosion protection provided by the resulting vinyl silane coating is surprisingly superior to conventional chromate-based treatments, and avoids the chromium disposal problem. In addition, the vinyl silane coating need not be removed prior to painting or application of another polymer (such as adhesives or rubbers), and in fact offers excellent paint adhesion and corrosion protection beneath the layer of paint.

The treatment method of the present invention may be used on any of a variety of metal sheets, including aluminum sheet, aluminum alloy sheet, and steel sheet coated with zinc, zinc alloy, aluminum or aluminum alloy. It should be noted that the term "metal sheet" includes both continuous coil as well as cut lengths. The treatment method of the present invention is particularly suitable for coated steel such as galvanized steel, GALVALUME® (sold by Bethlehem Steel), GALFAN® (sold by Weirton Steel Corp., of Weirton, W.V.), and similar types of coated steel. More particularly, the treatment method of the present invention provides improved corrosion protection for hot-dipped galvanized steel.

The vinyl silane solution is preferably applied to the metal sheet prior to shipment to the end-user, and offers corrosion protection during shipment and storage of the metal sheet, including the prevention of white rust on galvanized steel. The end user may then merely solvent clean and/or alkaline clean the sheet in the normal fashion, and then apply paint or another polymer (e.g., such as adhesives or rubber coatings) directly on top of the layer of vinyl silane. The vinyl silane coating on the metal sheet not only provides excellent corrosion protection, but also superior paint (or polymer) adhesion. Thus, unlike many of the currently-employed corrosion treatment techniques, the vinyl silane coating need not be removed prior to painting.

The preferred vinyl silanes in the treatment solution may be fully or partially hydrolyzed, and thus each of the hydrolyzed vinyl silanes has a

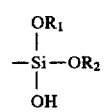

at one terminus and a vinyl group at the opposite terminus, wherein $R_1$ and $R_2$ are each chosen from the group consisting of hydrogen, alkyl, and acetyl. When fully hydrolyzed, $R_1$ and $R_2$ are hydrogen. The unhydrolyzed vinyl silanes which may be used to prepare the treatment solution include the following:

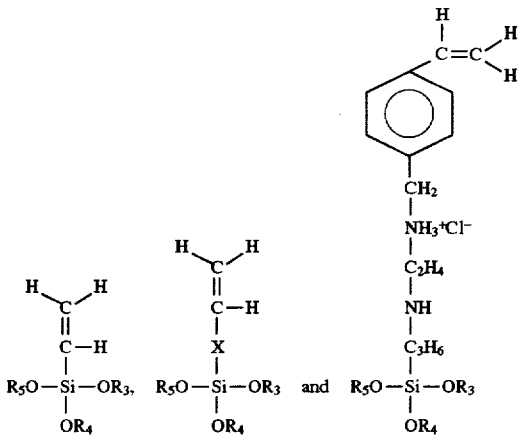

wherein X is an alkyl group, preferably $C_1$-$C_{10}$ alkyl, and $R_3$, $R_4$, and $R_5$ are each chosen from the group consisting of: $C_1$-$C_4$ alkyl, and acetyl. Suitable vinyl silanes falling within the above description include: vinyltrimethoxysilane, vinyltriethoxysilane, vinyltripropoxysilane, vinyltriisopropoxysilane, vinyltributoxysilane, vinylacetoxysilane, vinylmethyltrimethoxysilane, vinylethylltrimethoxysilane, vinylpropyltrimethoxysilane, and N-[2-(vinylbenzylamino)-ethyl]-3-aminopropyltrimethoxysilane (SAAPS). One particularly preferred vinyl silane is vinyltrimethoxysilane, sold as A-171 by OSI Specialties, Inc., of Tarrytown, N.Y.

The above-described silanes must be at least partially, and preferably fully hydrolyzed so that the silane will bond to the metal surface. During hydrolysis, the alkoxy or acetoxy groups are replaced with hydroxyl groups. Thus, for example, vinyltrimethoxysilane is fully hydrolyzed according to the following equation:

Upon drying of a solution of hydrolyzed vinyl silanes which has been applied to

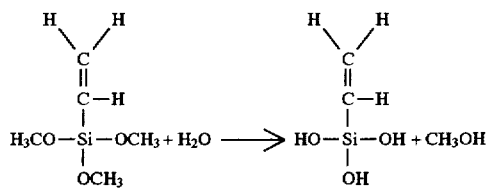

a metal surface, it is believed that the silanol groups condense to siloxane structures which become chemically bonded to the metal surface. Hydrolysis of the vinyl silane may be accomplished merely by mixing the vinyl silane with water, and optionally including a solvent such as an alcohol in order to improve solubility of the vinyl silane. The pH of the solution is also preferably maintained below about 8, and more preferably about 4, in order to improve hydrolysis. The pH may be adjusted, for example, by the addition of a weak acid, such as acetic acid.

Applicants believe that the beneficial results of the treatment method of the present invention are due, in part, to the fact that a thin layer of the hydrolyzed vinyl silane monomer is strongly bonded to the oxides on the surface of the metal sheet. The metal surface is passivated, and the condensation of moisture is prevented by the hydrophobic nature of the vinyl group. Thus, during preparation of the vinyl silane solution, care must be taken to ensure that the hydrolyzed vinyl silane does not polymerize via a condensation reaction. If the monomer is permitted to polymerize, the coating will not adhere to the metal and will therefore not form a complete film on the metal sheet.

Polymerization of the hydrolyzed vinyl silane can be prevented by ensuring that a fresh solution of hydrolyzed vinyl silanes is employed, since the reaction will occur slowly over a period of time. More importantly, the polymerization reaction can be inhibited by proper choice of the pH of the solution. The condensation reaction is generally inhibited at a pH below about 8, particularly below about 6, while the hydrolysis reaction itself will still occur at below a pH of 8. The pH of the treatment solution should also be at least about 3, particularly when the hydrolyzed vinyl silane solution is used to treat galvanized steel, in order to ensure that the base metal and its coatings (e.g., zinc) will not be attacked. For example, the zinc coating on galvanized steel will begin to dissolve at a pH below about 3. Thus, it is preferred that the pH of the treatment solution of the present invention be between about 3 and about 8, and more preferably between about 4 and about 6.

Applicants have also found that the concentration of hydrolyzed vinyl silanes in the treatment solution will affect the degree of corrosion protection. Thus, it is preferred that the solution be prepared using greater than about 4% unhydrolyzed vinyl silanes by volume. It should be noted that the concentration of vinyl silanes discussed and claimed herein are all measured in terms of the ratio between the amount of unhydrolyzed vinyl silanes employed (i.e., prior to hydrolyzation), and the total volume of treatment solution components (i.e., vinyl silanes, water, optional solvents and pH adjusting acids). In addition, the concentrations refer to the total amount of unhydrolyzed vinyl silanes added, as multiple vinyl silanes may optionally be employed. At concentrations below about 4%, it has been found that the corrosion protection will be limited. Higher concentrations (greater than about 10%) should also be avoided in order to prevent the condensation reaction from occurring, and to avoid the waste of vinyl silane. In addition, treatment solutions containing higher concentrations of vinyl silane will produce thick films which are very weak and brittle. Since the solubility in water of some of the vinyl silanes used in the present invention may be limited, the treatment solution may optionally include one or more solvents, such as an alcohol, in order to improve silane solubility. Particularly preferred alcohols include: methanol, ethanol, propanol, butanol, and isomers thereof. The amount employed will depend upon the solubility of the particular vinyl silanes, and thus the treatment solution of the present invention may contain up to about 95 parts of alcohol (by volume) for every 5 parts of water. Methanol is the preferred alcohol.

The treatment method itself is very simple. The unhydrolyzed vinyl silane(s), water, alcohol (if needed), and a small amount of acetic acid (to adjust the pH) are combined with one another. Other weak acids may alternatively be employed to adjust the pH as needed. The solution is then stirred at room temperature in order to hydrolyze the vinyl silane. The hydrolysis may take up to several hours to complete, and its completion will be evidenced by the solution becoming clear. In order to ensure that the hydrolyzed vinyl silane monomers do not condense (or polymerize), the solution should be used shortly after preparation (preferably within one day). The metal sheet is preferably solvent and/or alkaline cleaned by techniques well-known in the prior art prior to application of the treatment composition of the present invention. The treatment solution may then be applied to the cleaned metal sheet (i.e., by coating the sheet with the solution) by either dipping the sheet into the solution (also referred to as "rinsing"), or spraying the solution onto the surface of the metal. When the preferred application method of dipping is employed, the duration of dipping is not critical, as it generally does not affect the resulting film thickness. It is preferred that the dipping time be between about ten seconds and about one hour, preferably only about two minutes to ensure complete coating of the metal sheet.

After coating with the treatment solution of the present invention, the metal sheet is then air-dried at room temperature, and optionally placed into an oven for heat treatment. The heat treatment may take place at temperatures between about 60° C. and about 200° C. for between about 5 and about 120 minutes. Preferably, heat treatment is performed at a temperature of about 180° C. for about 10 minutes. While the heat treatment step is not necessary to achieve satisfactory results, it will improve drying time thereby lessening the likelihood of the formation of white rust during drying. Of course the heat treatment step will, on the other hand, consume large amounts of energy. The treated metal sheet may then be shipped to the end-user, and even stored for a period of time prior to use.

The coating of the present invention provides significant corrosion resistance during the period of shipping and storage. In addition, and just as significant, the coating need not be removed prior to painting or the application of other polymer coatings. The end-user, such as an automotive manufacturer, may apply paint directly over top the vinyl silane coating without additional treatment such as the application of chromates. The vinyl silane not only provides a surprisingly high degree of paint adhesion (apparently through covalent bonding with the vinyl groups), but also prevents delamination and underpaint corrosion even if a portion of the base metal is exposed to the atmosphere. The surface of the metal, however, should be solvent and/or alkaline cleaned prior to application of the paint or other polymer coating, using methods well-known in the prior art. Suitable polymer coatings include various types of paints, adhesives (such as epoxy automotive adhesives), and rubber coatings (e.g., natural, NBR, SBR, nitrile or silicone rubber). Suitable paints include polyesters, polyurethanes and epoxy-based paints.

As mentioned previously, the methods of the present invention are particularly useful for the treatment of pre-coated steel, such as steel which has been coated with either zinc or zinc alloys (e.g., hot-dipped galvanized steel). Although the zinc coating galvanically protects exposed steel, corrosion can occur beneath a paint layer which is applied to the zinc-coated steel.. This is particularly true if a portion of the painted steel is damaged such that the steel layer itself is exposed to the atmosphere. Although the zinc coating will protect the steel from rusting by means of sacrificial galvanic action, the corroding zinc coating will generate zinc ions which migrate to the exposed steel and combine with hydroxyl ions to form white rust. Over a period of time, the zinc coating beneath the paint will slowly corrode, resulting in a delamination of the paint film.

While the phosphate/chromate treatments of the prior art tend to reduce paint delamination of galvanized steel to some extent, the results obtained are far from ideal. Thus, corrosion and delamination of paint will often spread from a small region of exposed steel (i.e., a scratch in the painted surface) over a period of time (referred to as "creepage" or "creepback"). Applicants have surprisingly found that the vinyl silane treatments of the present invention provide considerable protection against such creepage, and thus, provide an effective undercoating for painted zinc or zinc alloy coated steel, (particularly hot-dipped galvanized steel). Just as importantly, the treatment methods of the present invention eliminate the costly, toxic and environmentally unsound prior art treatment methods employing phosphates and chromates.

The examples below demonstrate some of the superior and unexpected results obtained by employing the methods of the present invention.

EXAMPLE 1

A treatment solution according to the present invention having 5% (by volume) of a vinyl silane was prepared as follows. 5 ml of vinyltrimethoxysilane (obtained from OSI Specialties, Inc., as A-171) was combined with 5 ml of methanol, and 0.5 ml of 1M acetic acid. The solution was then diluted with water to 100 ml, thereby providing a vinyl silane concentration of 5% by volume (in terms of the amount of silane initially present). The pH of the solution was 4.1. Treatment solutions having vinyltrimethoxysilane concentrations of 1%, 2%, 3% and 4% were prepared in a similar fashion. Panels of hot-dipped galvanized steel ("HDG") measuring 10 cm×15 cm were then solvent-cleaned and alkaline-cleaned, cleaned, dipped into the treatment solutions for approximately one minute, removed, air-dried at room temperature, and then heat treated at 185° C. for about 15 minutes.

In order to simulate the conditions experienced by coiled HDG during storage and shipment, the treated HDG panels were then subjected to a "stack test." Three identically treated panels were wetted with water, clamped to one another in a stack, and then placed in a humidity chamber at 60° C. and 85%RH. Interfacing surfaces of the panels (i.e., surfaces which contacted another panel) were monitored after one day for the presence of white, and the following results were observed:

| Concentration of Vinyl Silane Solution (vol. %) | Percentage of Surface Covered by White Rust |
| --- | --- |
| 1 | 15 |
| 2 | 30 |
| 3 | 15 |
| 4 | 5 |
| 5 | none |

The panel treated with a 5% vinyl silane solution was then permitted to remain in the humidity chamber, with the interfacing surfaces of the panel rewetted every day, and no white rust was observed after two weeks. In contrast, untreated HDG panels formed white rust over 50% of their surface after only one day, and panels coated with a conventional chromate film (CHEM COTE RF 1000, treatment available from Brent America, Inc.) began to form white rust after one week (with rewetting of the interfacing surfaces each day). Thus, the treatment solution and method of the present invention provide protection against white rust, particularly when the vinyl silane concentration is greater than about 4%.

EXAMPLE 2

A 5% treatment solution containing vinyltrimethoxysilane was prepared as outlined in Example 1, and was used to coat HDG panels in the same manner as in Example 1 (including the heat treatment step). The thus treated panels were then powder painted with polyester and polyurethane paints in the conventional manner (Sample C). Untreated HDG panels were solvent-cleaned and painted in a similar fashion (Sample A). Finally, HDG panels were also solvent cleaned, and then treated with a conventional zinc phosphate conversion coating (CHEM COTE 3200 coating, available from Brent America, Inc.) followed by a chromate rinse (CHEM SEAL 3603 rinse, available from Brent America, Inc.) (Sample B). The panels of Samples A and B were also powder painted with polyester and polyurethane paints.

In order to measure creepage, which in turn is indicative of the degree of paint adhesion and corrosion protection, a carbide-tipped pencil-type scribing tool was used to produce a 3-inch long scribe in each of the panels. The scribe was sufficiently deep to expose the base metal. The scribed panels were then subjected to a salt spray test (ASTM B 117), as well as a cyclic corrosion test (General Motors test number GM9540P). The salt spray test for the polyester powder-painted panels was conducted for one week, while the polyurethane powder-painted panels were subjected to the salt spray test for two weeks. The cyclic corrosion test was conducted for four weeks on all of the panels. After completion of the test period, a piece of adhesive tape was secured atop each scribe and then pulled off of the panel. The average width of the area of paint delamination was then measured for each panel, and the following results were obtained:

| Sample ID | Salt Spray Test Width of Creepage (mm) | | Cyclic Corrosion Test Width of Creepage (mm) | |
|---|---|---|---|---|
| | polyester | polyurethane | polyester | polyurethane |
| A | 51.8 ± 20.8 | 57.0 ± 11.9 | 22.8 ± 11.5 | 9.9 ± 2.5 |
| B | 4.0 ± 1.2 | 12.0 ± 4.2 | 11.0 ± 6.2 | 18.8 ± 10.1 |
| C | 1.1 ± 0.6 | 1.3 ± 2.0 | 1.1 ± 1.0 | 1.3 ± 0.8 |

As indicated by the above results, the treatment method of the present invention provides significant protection against creepage as compared to both untreated panels as well as those treated with the phosphate/chromate treatment method. These results clearly indicate that the treatment methods of the present invention not only provide excellent corrosion resistance, but also excellent paint adhesion.

The foregoing description of preferred embodiments is by no means exhaustive of the variations in the present invention that are possible, and has been presented only for purposes of illustration and description. Obvious modifications and variations will be apparent to those skilled in the art in light of the teachings of the foregoing description without departing from the scope of this invention. For example, various types of polymer coatings other than paint may be applied on top of the vinyl silane coating of the present invention. In addition, vinyltrimethoxysilane is but merely one exemplary vinyl silane which may be employed. Thus, it is intended that the scope of the present invention be defined by the claims appended hereto.

We claim:

1. A method of preventing corrosion of a metal sheet, comprising the steps of:

(a) providing a metal sheet, said metal chosen from the group consisting of:
       steel sheet coated with a metal chosen from the group consisting of: zinc, zinc alloy, aluminum and aluminum alloy;
       aluminum sheet; and
       aluminum alloy sheet, and (b) applying a treatment solution containing at least one hydrolyzed vinyl silane directly onto said metal sheet, said treatment solution prepared by hydrolyzing at least one unhydrolyzed vinyl silane, each of said hydrolyzed vinyl silanes having a

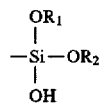

at one terminus and a vinyl group at the opposite terminus, wherein $R_1$ and $R_2$ are each chosen from the group consisting of hydrogen, alkyl, and acetyl, and wherein the total concentration of unhydrolyzed vinyl silanes employed to prepare the treatment solution is greater than about 4% by volume, based upon the total volume of the treatment solution, and wherein the pH of said treatment solution is between about 3 and about 8.

2. The method of claim 1, wherein said at least one unhydrolyzed vinyl silane is selected from the group consisting of:

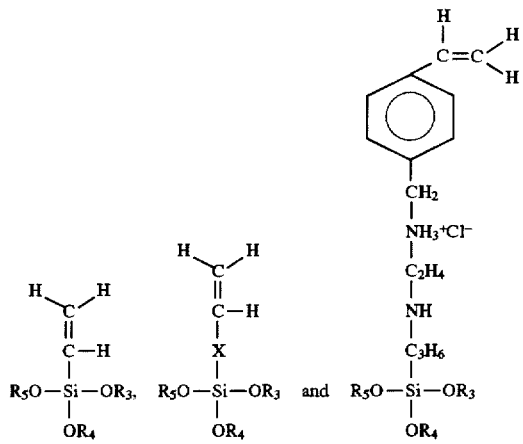

wherein X is an alkyl group, and $R_3$, $R_4$, and $R_5$ are each chosen from the group consisting of: $C_1$–$C_4$ alkyl, and acetyl.

3. The method of claim 2, wherein X is a $C_1$–$C_{10}$ alkyl.

4. The method of claim 3, further comprising the step of applying a polymer coating after said step of applying said treatment solution, said polymer chosen from the group consisting of: paints, adhesives and rubbers.

5. The method of claim 3, further comprising the step of applying a coating of paint after said step of applying said treatment solution.

6. The method of claim 3, wherein said treatment solution further comprises water.

7. The method of claim 6, wherein said treatment solution further comprises at least one alcohol.

8. The method of claim 7, wherein said alcohol is chosen from the group consisting of: methanol, ethanol, propanol, butanol, and isomers thereof.

9. The method of claim 1, wherein said treatment solution is applied to said sheet by dipping said sheet in said solution for between about 10 seconds and about one hour, and the pH of said solution is between about 4 and about 6.

10. The method of claim 5, further comprising the step of heat treating said sheet after application of said treatment solution and prior to applying said paint coating.

11. The method of claim 3, wherein said at least one unhydrolyzed vinyl silane is vinyltrimethoxysilane.

12. A method of preventing corrosion of polymer coated steel, comprising the steps of:

(a) providing a steel sheet coated with a metal chosen from the group consisting of: zinc, zinc alloy, aluminum and aluminum alloy;

(b) applying a coating of a treatment solution directly onto said steel sheet, said treatment solution consisting essentially of at least one hydrolyzed vinyl silane, and having a pH of between about 3 and about 8, said solution prepared by hydrolyzing at least one unhydrolyzed vinyl silane selected from the group consisting of:

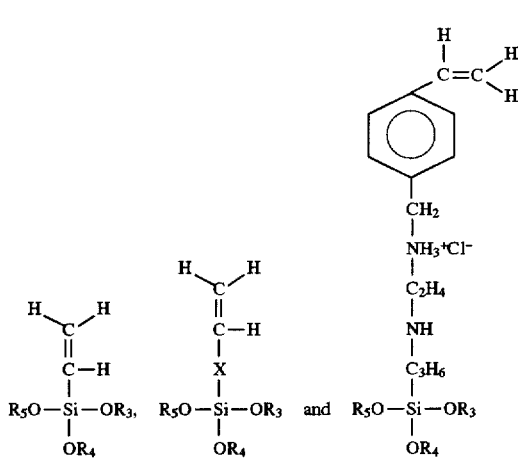

wherein X is a $C_1$–$C_{10}$ alkyl, and $R_3$, $R_4$, and $R_5$ are each chosen from the group consisting of: $C_1$–$C_4$ alkyl, and acetyl, and wherein the total concentration of unhydrolyzed vinyl silanes employed to prepare said treatment solution is greater than about 4% by volume, based upon the total volume of said treatment solution; and (c) coating said steel sheet with a polymer without removing said vinyl silane coating, said polymer selected from the group consisting of: paints, adhesives, and rubbers.

13. The method of claim 12, wherein said polymer is a paint.

14. The method of claim 13, wherein said steel sheet is hot dip coated with a metal chosen from the group consisting of zinc, zinc alloy, aluminum and aluminum alloy.

15. The method of claim 13, wherein said steel sheet is hot-dipped galvanized steel.

16. The method of claim 13, wherein said at least one unhydrolyzed vinyl silane is selected from the group consisting of vinyltrimethoxysilane, vinyltriethoxysilane, vinyltripropoxysilane, vinyltriisopropoxysilane, vinyltributoxysilane, vinylacetoxysilane, vinylmethyltrimethoxysilane, vinylethylltrimethoxysilane, vinylpropyltrimethoxysilane, and N-[2-(vinylbenzylamino)-ethyl]-3-aminopropyltrimethoxysilane.

17. The method of claim 16, wherein said at least one unhydrolyzed vinyl silane is vinylpropyltrimethoxysilane.

18. The method of claim 13, wherein said paint is a polyester, polyurethane or epoxy.

19. The method of claim 12, wherein said treatment solution further comprises water.

20. The method of claim 19, wherein said treatment solution further comprises an alcohol chosen from the group consisting of: methanol, ethanol, propanol, butanol, and isomers thereof.

21. The method of claim 13, wherein said vinyl silane solution is applied to said sheet by dipping said sheet in said solution for between about 10 seconds and about one hour, and the pH of said solution is between about 4 and about 6.

22. The method of claim 1, wherein said treatment solution consists essentially of at least one hydrolyzed vinyl silane.

23. A method of preventing corrosion of a metal sheet, comprising the steps of:

(a) providing a metal sheet, said metal chosen from the group consisting of:
  steel sheet coated with a metal chosen from the group consisting of: zinc, zinc alloy, aluminum and aluminum alloy;
  aluminum sheet; and
  aluminum alloy sheet; and (b) applying a treatment solution consisting essentially of at least one hydrolyzed vinyl silane to said metal sheet, said at least one unhydrolyzed vinyl silane is vinyltrimethoxysilane, said treatment solution prepared by hydrolyzing said vinyltrimethoxysilane, and wherein the total concentration of unhydrolyzed vinyltrimethoxysilane employed to prepare the treatment solution is greater than about 4% by volume, based upon the total volume of the treatment solution, and wherein the pH of said treatment solution is between about 3 and about 8.

* * * * *

UNITED STATES PATENT AND TRADEMARK OFFICE
CERTIFICATE OF CORRECTION

PATENT NO. : 5,759,629
DATED : June 2, 1998
INVENTOR(S) : van Ooij, et al.

It is certified that error appears in the above-identified patent and that said Letters Patent is hereby corrected as shown below:

Column 1, line 3, insert:

Government Rights

This invention was made with government support under CR 82296-01-0 awarded by the Environmental Protection Agency. The government has certain rights in the invention.

Signed and Sealed this

Ninth Day of February, 1999

Attest:

Attesting Officer

*Acting Commissioner of Patents and Trademarks*